Dec. 25, 1962
M. A. STEPHENSON
3,069,930
BORING BAR ADAPTER
Filed Oct. 11, 1961
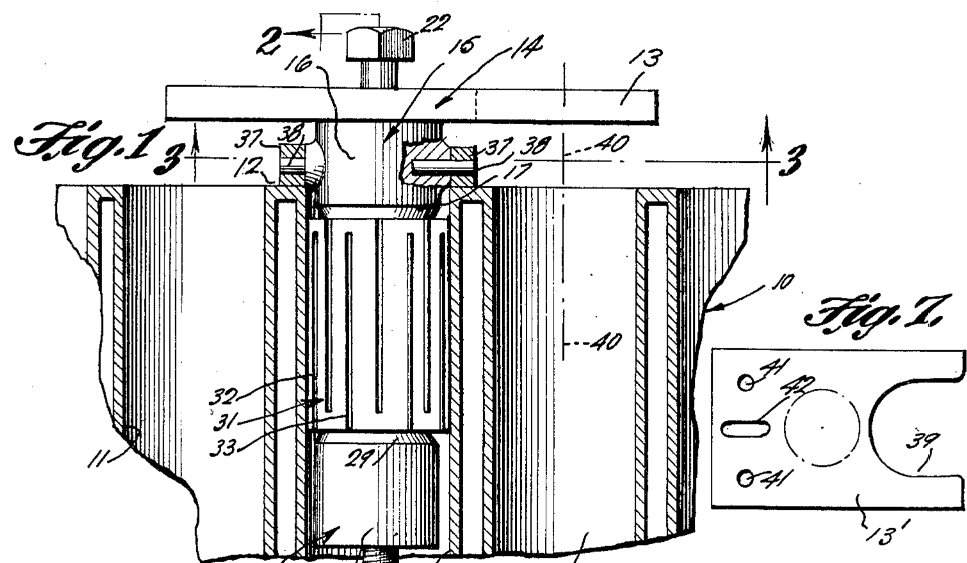
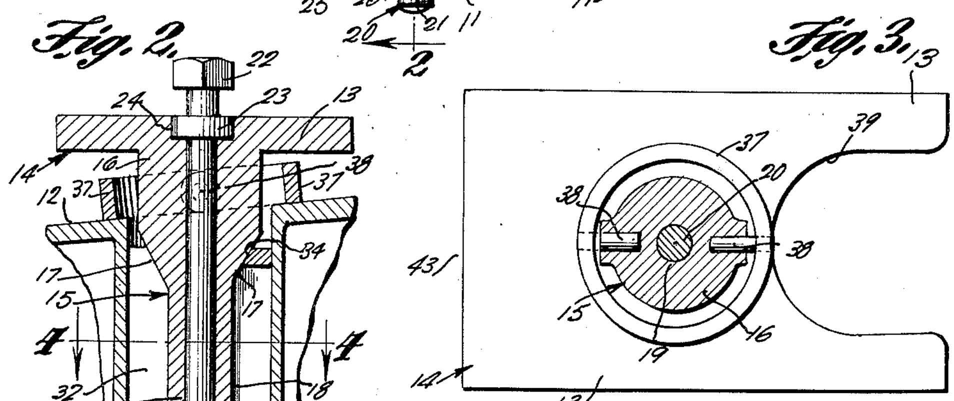
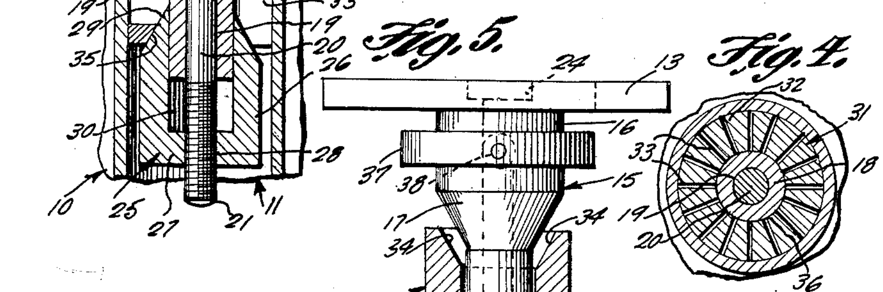
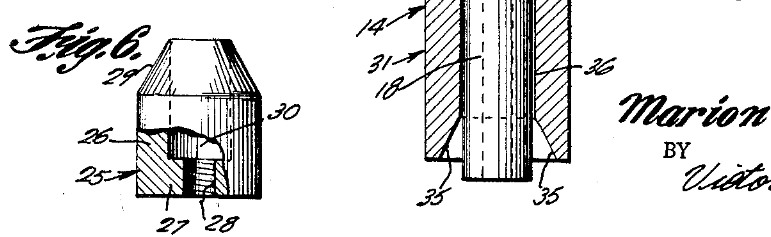
INVENTOR.
Marion A. Stephenson,
BY
Victor J. Evans & Co.
Attorneys United States Patent Office 3,069,930
Patented Dec. 25, 1962

3,069,930

BORING BAR ADAPTER

Marion A. Stephenson, P.O. Box 252, Yucaipa, Calif.
Filed Oct. 11, 1961, Ser. No. 144,420
2 Claims. (Cl. 77—2)

The present invention relates to an adapter or attachment for facilitating the reboring of cylinders on automotive engines or the like.

The primary object of the present invention is to provide an attachment or adapter which is adapted to be used on motors or engine blocks which have an inclined top surface so that with the present invention the necessity of using a dummy wedge-shaped plate between the block and boring bar is eliminated.

A further object is to provide a boring bar adapter which is constructed so that contact with the cylinder will be made for the entire circumference and also for the entire length of a sleeve which forms part of the adapter so that considerably less force is necessary to clamp the fixture in the cylinder, as for example as compared to previous fixtures of this type.

Still another object is to provide such a boring bar adapter that is economical to manufacture and efficient in operation and which is rugged in structure and foolproof in operation.

These and other objects of the invention will become apparent from a reading of the following specification and claims, together with the accompanyings drawings, wherein like parts are referred to and indicated by like reference characters and wherein:

FIGURE 1 is a fragmentary sectional view taken through a cylinder block and showing the adapter of the present invention being used, and with parts broken away and in section.

FIGURE 2 is a sectional view taken on the line 2—2 of FIGURE 1.

FIGURE 3 is a sectional view taken on the line 3—3 of FIGURE 1.

FIGURE 4 is a sectional view taken on the line 4—4 of FIGURE 2.

FIGURE 5 is an elevational view, with parts broken away and in section.

FIGURE 6 is a detailed view of the bottom cam piece or cone, and with parts broken away and in section.

FIGURE 7 is a top plan view on a reduced scale illustrating a modification.

Referring in detail to the drawings, the numeral 10 indicates a portion of a conventional engine or block which includes the usual cylinders 11, and as shown in the drawings the engine 10 is of the type which includes an inclined top surface 12.

According to the present invention there is provided a boring bar adapter or attachment which is indicated generally by the numeral 14, and the adapter 14 is shown to comprise a spindle or stem 15, and the spindle 15 is shaped to include an upper cylindrical portion 16 which has a lower conical surface 17, for a purpose to be later described. A flat plate 13 is formed integral with the upper end of the spindle 15, FIGURE 2. The spindle 15 further includes a lower cylindrical section 18, and the spindle 15 is provided with a longitudinally extending opening 19.

The numeral 20 indicates an adjusting bolt which extends longitudinally through the opening 19 and the spindle 15, and the bolt 20 includes a lower threaded end portion 21, and the bolt 20 further includes an upper enlarged head 22. The bolt 20 is further provided with an enlarged shoulder 23 which is arranged in spaced parallel relation below the head 22, and there is provided a recess 24 in the plate 13 for receiving therein the shoulder 23.

As shown in the drawings, the adapter of the present invention further includes a sliding cone 25 which embodies a cylindrical wall portion 26, and the cone 25 further includes a bottom wall 27 which has a threaded aperture 28 that threadedly receives or engages the threaded portion 21 of the bolt 20. The wall portion 26 is further provided with an upper tapered surface 29, FIGURE 6, and the interior of the cone 25 is hollow as at 30 for snugly receiving therein the lower end of the spindle 15 when the parts are in their proper assembled position.

There is further provided a cylindrical sleeve which is indicated generally by the numeral 31, and the sleeve 31 is provided with a plurality of spaced parallel slots 32 and 33. As shown in FIGURE 1 for example, the slots 32 all extend from the upper end of the sleeve 31 to a point which is spaced above the lower end of the sleeve, and the alternate slots 33 extend from the lower end of the sleeve to points which are spaced just below the top end of the sleeve. As shown in FIGURE 5, the sleeve 31 is provided with a centrally disposed recess or opening 36 for the projection therethrough of the cylindrical section 18 of the spindle 15, and the sleeve 31 has flaring or tapered inner end surfaces or portions 34 and 35 for coaction with and engagement with the surfaces 17 and 29.

The numeral 37 indicates a ring member or circular collar which surrounds the upper cylindrical portion 16 of the spindle 15, and the collar 37 is swivelly connected to the portion 16 by means of studs or pins 38, and the pair of studs 38 are arranged in diametrically opposed relation with respect to each other, as for example as shown in FIGURE 3.

As shown in FIGURE 3, the plate 13 is provided with a recess or cutout 39 which provides clearance for the projection therethrough of a portion of a boring bar and such a boring bar may be indicated by the numeral 40 in FIGURE 1 and the boring bar is illustrated schematically or diagrammatically by the vertically disposed dotted line. The boring bar 40 may have a conventional construction and may be secured in place to the plate 13 in any suitable manner.

As shown in FIGURE 7 a modified plate 13' is illustrated which is adapted to be used in lieu of or instead of a plate such as the plate 13, and the plate 13' includes openings such as the openings 41 as well as a slot 42, and these openings and slots are adapted to be used for connecting a boring bar platform or the like to the plate 13'.

It will be seen therefore that according to the present invention there has been provided an attachment for facilitating the boring of cylinders such as the cylinders 11 on an automotive engine such as the engine 10. The present invention can be used with any suitable make of boring bar. Some motors now have the top surface of the block machined as much as sixteen degrees from right angles to the cylinders, and such a surface is indicated by the numeral 12 in the drawings. Because the present boring bars use the top surface of the cylinder block to align the cutting head and guide the bar down the cylinder, it is not possible to rebore the motors without using a dummy wedge-shaped plate between the block and the boring bar and this necessitates the purchase of a separate plate for each make and model of motor worked on by the mechanic or the like. The attachment of the present invention is adapted to clamp inside one cylinder and align the boring bar such as the boring bar 40 for correctly boring the adjacent cylinder, and it will correctly align a boring bar on any present cylinder block regardless of the angle or number of cylinders. The attachment may be fitted to different types of boring bars and it is to be noted that the attachment or adapter of the present invention consists of the flat plate or platform 13 which has the stem or spindle 15 at right angles to the top surface of this plate. The spindle is provided with the tapered surface 17, and there is also provided the slidable cone 25 which slides vertically on the lower portion of the spindle, and the cone 25 has the tapered surface 29 as shown in the drawings. An expanding sleeve 31 is used between the surfaces 17 and 29 so as to obtain a clamping action inside the cylinder bore. The collar 37 is pivoted just below the top plate 13, and the collar 37 is free to tilt sideways in conformity with the top surface 12 of the cylinder block and this feature insures that the boring bar 40 will set the same distance above the block on all cylinders and also insures that the attachment will always be in line longitudinally with the rest of the line of cylinders. The clamping bolt 20 which passes through the center of the device has the hexagonal head 22 which can be engaged by a wrench or other tool so as to permit sliding movement of the cone 25 as the bolt 20 is rotated, and this permits adjustment for size. The bolt 20 also has the shoulder 23 which seats in the recess 24 of the plate 13.

It is to be noted that with the present invention when the bolt 20 is properly rotated, the cone 25 can be caused to move towards the plate 13 so that with the sleeve 31 in place and with the parts assembled and positioned in a cylinder such as the cylinder 11, it will be seen that as the bolt 20 is properly rotated, the surfaces 29 and 17 will coact with and engage the surfaces 35 and 34 to expand the sleeve 31 in the bore of the cylinder so that the necessary clamping action can be accomplished. The provision of the plurality of slots 32 and 33 serves to insure that the sleeve will have the necessary ability to expand and contract whereby the clamping or releasing action of the sleeves can be brought about. By having alternate slots extend from different ends of the sleeve, the expansion and contraction of the sleeve can take place, and wherein the sleeve will still have a unitary formation or shape.

Previous devices of this type are not satisfactory or advantageous over the present invention, and for example as compared to prior such devices, the present invention has very good stability, and the machine or fixture of the present invention contacts the cylinder for the entire circumference and also for the entire length of the sleeve, and this permits for considerable less force necessary to clamp the fixture in the cylinder.

In some applications the extension may be left off the bolt and either a threaded hole or a simple slot can be provided in the top plate and this arrangement will accommodate any make of boring bar made at the present time.

It is to be noted that the only requirement of an adapter constructed according to the present invention is that its supply of flat surface at right angles to the cylinder bore, and of a sufficient size to comfortably support the bottom surface of the boring machine. It is not necessary or desirable to confine the boring bar to any definite position on the platform except by the use of the one clamp fixture or bolt. Some bars are made to clamp by an extension while others only require a threaded hole or slotted opening in the platform.

While certain embodiments of the invention have been illustrated and described in detail, it will be obvious that the invention may be otherwise embodied and the dimensions and interrelation of parts changed so long as the objects of the invention are attained.

What is claimed is:

1. An attachment for use with a boring bar in reboring cylinders of engines and wherein the engine includes a block that has an inclined top surface; said attachment comprising a flat plate having a spindle depending therefrom at right angles thereto and said spindle and flat plate being integrally affixed together, said spindle including an upper cylindrical portion having a lower conical surface, said spindle further including a lower cylindrical section, there being a longitudinally extending centrally disposed opening in said spindle, an adjusting bolt extending through said openings, and said bolt including a lower threaded end portion, said bolt further including an enlarged head on its upper end, and said bolt having an enlarged shoulder arranged in spaced parallel relation below said head, there being a recess in said plate for receiving said shoulder, a sliding cone including a cylindrical wall portion having an upper tapered surface, said cone further including a bottom wall having a threaded aperture arranged in threaded engagement with the threaded portion of said bolt, the interior of said cone being hollow for receiving therein the lower end of said spindle, a cylindrical sleeve arranged in a cylinder of the engine block and said sleeve having a plurality of spaced parallel slots therein, alternate slots extending from opposite ends of the sleeve, said sleeve including flaring end surfaces for coaction and engagement with the conical surface of the spindle and the tapered surface of the cone; a collar surrounding the upper cylindrical portion of said spindle, and diametrically opposed studs swivelly connecting said collar to the upper cylindrical portion of said spindle.

2. A boring bar adapter comprising a flat plate having a spindle depending therefrom, said spindle including an upper cylindrical portion having a lower conical surface, said spindle further including a lower cylindrical section, there being a longitudinally extending centrally disposed opening in said spindle, an adjusting bolt extending through said opening, said bolt including a lower threaded end portion, said bolt further including an enlarged head on its upper end, and said bolt further including an enlarged shoulder arranged in spaced parallel relation below said head, there being a recess in said plate for receiving said shoulder, a sliding cone including a cylindrical wall portion having an upper tapered surface, said cone further including a bottom wall having a threaded aperture arranged in threaded engagement with the threaded portion of said bolt, the interior of said cone being hollow for receiving therein the lower end of said spindle, a cylindrical sleeve having flaring inner end surfaces for coaction with the conical surface of the spindle and the tapered surface of the cone, there being a plurality of spaced parallel slots in said sleeve, a collar surrounding the upper cylindrical portion of said spindle, and diametrically opposed studs swivelly connecting said collar to the upper cylindrical portion of the spindle.

References Cited in the file of this patent

UNITED STATES PATENTS 2,914,330 Wheeler -------------- Nov. 24, 1959